United States Patent

[11] 3,582,252

| [72] | Inventors | Jack M. Reid;<br>Sanford A. Weil; William R. Staats, all of Chicago, Ill. |
|---|---|---|
| [21] | Appl. No. | 867,481 |
| [22] | Filed | Oct. 20, 1969 |
| [45] | Patented | June 1, 1971 |
| [73] | Assignee | The Institute of Gas Technology, a not-for-profit Corporation<br>Chicago, Ill. |

[54] LUMINESCENT GAS LAMP
9 Claims, 2 Drawing Figs.

[52] U.S. Cl. .................................................. 431/242,
431/157, 431/347, 431/350
[51] Int. Cl. .................................................. F23I 17/00
[50] Field of Search ........................................... 431/157,
347, 350, 94, 242

[56] References Cited
UNITED STATES PATENTS

| 2,570,554 | 10/1951 | Henwood | 431/353X |
| 2,920,222 | 1/1960 | Thorington | 313/109 |
| 3,481,679 | 12/1969 | Lehrer | 431/158 |

*Primary Examiner*—Carroll B. Dority, Jr.
*Attorney*—Dominik, Knechtel & Godula

ABSTRACT: A light source which includes, generally, an evacuated light-transmitting envelope, the interior surface of which is coated with phosphors of the type which are excited by "active" (dissociated) gases to produce visible light. The envelope further includes a gas-fired high temperature energy source of radiant energy, and a gas which dissociated in the presence of this energy source of radiant energy.

PATENTED JUN 1 1971

3,582,252

INVENTORS
Jack M. Reid
Sanford A. Weil
William R. Staats
BY
Dominik, Knechtel & Godula
ATTYS.

LUMINESCENT GAS LAMP

This invention relates to a new and improved luminescent gas lamp.

In U.S. Pat. No. 2,920,222, there is disclosed an incandescent lamp producing light composed in part of the visible energy produced by an incandescent filament and the remainder from the illumination of active gas excitation of phosphors.

As fully explained in this patent, use is made of two phenomena to greatly improve the efficiency of an incandescent lamp, the first being the phenomenon of dissociation of hydrogen molecules into atoms in the presence of a hot tungsten wire which catalyzes this dissociation. The other is the phenomenon of excitation of certain phosphors by "active" (dissociated) gases.

Both of these phenomena are dependent upon the high temperature operation of the incandescent lamp, or more particularly, the high temperature operation of the tungsten filament. The hydrogen molecules impinging on the hot filament are absorbed and dissociated into atoms and subsequently are emitted from the filament. At sufficiently low pressures, the atoms travel unimpeded until they strike the coating on the bulb wall, whereupon they recombine on the surface of the coating to form molecules again with the release of energy to the coating. This coating converts this energy into visible light. The most efficient form of lamp is one in which the tungsten filament to phosphor spacing is such that maximum bombardment by hydrogen atoms occurs. This spacing, in turn, is determined in part by the pressure of the hydrogen fill so that the greater the pressure the smaller the spacing must be.

An electric lamp of this construction therefore is inherently limited, in view of the restrictive temperature range, usually between 2,200°—2,800° K., in which the tungsten filament can operate. Even when operated in this temperature range, the electric lamp or, more particularly, the filament, still has only a relatively short useful life. If the filament is operated at a higher temperature so as to produce more visible light, an appreciably higher hydrogen pressure is required to retard filament evaporation. This results in a higher value of power conducted away by the hydrogen so that, as a result, the efficiency of the electric lamp is substantially reduced rather than being increased.

Accordingly, it is an object of the present invention to provide a new and improved source of light, the operation of which makes use of the phenomenon of dissociation of hydrogen molecules into atoms in the presence of a high temperature energy source of radiant energy, in combination with the phenomenon of excitation of certain phosphors by "active" (dissociated) gases.

Another object is to provide a new and improved source of light of the above type wherein said high temperature energy source of radiant energy is gas fired.

Still another object is to provide a new and improved source of light of the above type which provides illumination more economically than a similar source of light wherein the source of energy is an electrically heated tungsten filament.

A still further object is to provide a new and improved luminescent gas lamp of the above-described type.

A still further object is to provide a new and improved luminescent gas lamp of the above-described type which has a much longer useful life than similar electric lamps.

Other objects of the invention will in part be obvious and will in part appear hereinafter.

The above objectives are accomplished with a light source which includes, generally, an evacuated light-transmitting envelope, the interior surface of which is coated with phosphors of the type which are excited by "active" (dissociated) gases to produce visible light. The envelope further includes a gas-fired high temperature energy source of radiant energy, and a gas which dissociates in the presence of this energy source of radiant energy.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
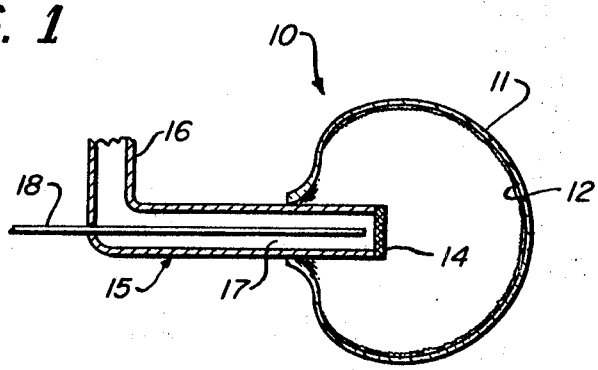
FIG. 1 is a sectional view of a gas lamp exemplary of the invention.
Figure 2:
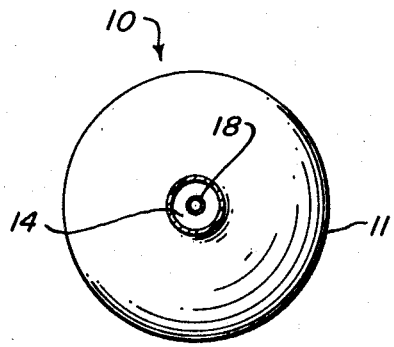
FIG. 2 is a sectional view taken along lines 2–2 of FIG. 1.

Referring now to the drawing, in FIGS. 1 and 2 there is illustrated a luminescent gas lamp 10 having a glass bulb 11 of suitable configuration, as described more fully below. The interior surface of this glass bulb is coated with a phosphor coating 12, of the same type and in the same fashion as the interior surface of the lamp disclosed in the above-mentioned U.S. Pat. No. 2,920,222. More particularly, as therein indicated, this coating may be of any single one or a mixture of two or more phosphors such as the oxides of Be, Mg, Ca, Zn, Si, Cd, Ba, and the sulfides of Cu, Zn, Si, Ba, B, A1, Ga and Ce, or any other phosphor which provides luminescense when it is exposed to "active" (dissociated) gases such as hydrogen.

This coating can be applied in any number of different ways suitable to the purpose, as for example, by the methods which are now used for coating incandescent lamp bulbs and fluorescent tubes. The coating also may be of a thickness comparable to that commonly used in fluorescent lamps and may be as thin as or thinner than the silica coating now used on white bulb incandescent lamps.

Disposed within the glass bulb 11 is a "hot spot" in the form of a plate 14 of high performance, refractory material which is heated by a gas burner 15 and primarily serves as the high temperature energy source and secondarily as a source of radiant energy. Preferably, this hot spot or plate 14 is of a material capable of withstanding temperatures of 3,000° K. or more and can be, for example, thorium oxide.

In the illustrated example, the gas burner 15 is a small recuperative burner of standard construction, and the hot spot or plate 14 is affixed to its one end and forms a part of it. This end of the burner is extended into the glass bulb 11. Conduit means 16 is provided for delivering a source of gaseous fuel such as methane and air into the burner body 17, and an exhaust conduit 18 is provided for exhausting the flue gases. As indicated above, the hot spot or plate 14 is heated to and maintained at a temperature of approximately 3,000° K., when the burner 15 is ignited.

The coated glass bulb 11 is highly evacuated as it is in the manufacture of ordinary incandescent lamps and hydrogen is introduced at relative low pressure, and the bulb sealed.

For operation, the recuperative gas burner 15 is ignited to heat the hot spot or plate 14 to a temperature of approximately 3,000° K. Hydrogen molecules impinging on the hot spot or plate 14 are absorbed and dissociated into atoms and subsequently are emitted from it. Many of the atoms travel until they strike the coating on the bulb wall, whereupon they recombine on the surface of the coating to form molecules again with the release of energy to the coating. This coating converts this energy into visible light and the hydrogen molecules thus formed desorb and eventually return to the hot spot or plate 14 to begin another cycle.

In a luminescent gas lamp of the above-described construction, the spacing between the hot spot or plate 14 and the phosphor coating preferably is a radius of approximately 10 cm. for hydrogen pressure of approximately 10 mm./Hg. However, a range of 1—50 mm./Hg can be reasonably employed. At a higher pressure, a smaller radius is needed to achieve the same intensity of light.

A luminescent gas lamp provides numerous advantages over an electric lamp which relies on the hot tungsten filament to cause dissociation of the hydrogen molecules and the subsequent excitation of the phosphor coating by the "active"

(dissociated) gases. For example, with the gas lamp, much higher operating temperatures can be achieved and used, without any dependence upon the hydrogen pressure. In the case of the electric lamp, if the filament is operated at higher temperatures, appreciably higher hydrogen pressures are required to retard filament evaporation and this results in too high a value for the power conducted away by the hydrogen gas. As a result, the efficiency of the electric lamp in converting heat to light is substantially reduced. On the other hand, with the gas lamp of the present invention, the only concern is to use a spacing and pressure which will provide the maximum bombardment by the hydrogen atoms. The hot spot or plate 14 therefore can be and is operated at the maximum possible temperature which can be tolerated by the materials which, in the case of thoria, is 3,000° K., a temperature substantially greater than a filament can be operated at and still retain any design life. The incandescence of the hot spot or plate 14 in combination with the visible light produced by the phosphor coating therefore provides far more illumination, at a much greater efficiency, than an electric lamp having a hot tungsten filament. Furthermore, the hot spot or plate 14 can be operated at this temperature for a far longer period of time than a tungsten filament can be operated even when the latter is designed to operate at optimum light efficiency for design life. The gas lamp of the present invention therefore also has a far longer useful or design life than such an electric lamp.

Because the hydrogen gas may have a tendency to diffuse through the bulb surface at the high temperature region, it is desirable to maintain a partial pressure of hydrogen in the burning gases. For hydrogen pressures within the bulb of 2 mm./Hg or less, the natural combustion products of methane and air would contain enough hydrogen to prevent loss of hydrogen from the gas bulb. In fact, the pressure of hydrogen would be maintained at 2 mm./Hg even if diffusion through the wall was significant. For operation at higher pressures within the bulb, it may be necessary to use a mixed fuel such as methane and hydrogen or even hydrogen alone, to achieve the appropriate partial pressure of hydrogen in the burning gases.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what we claim as new and desired to be secured by Letters Patent is:

1. A light source comprising: an evacuated light-transmitting envelope; a high temperature energy source in said envelope comprising a hot spot formed of high performance, refractory material and burner means fired by hydrocarbon fuel for heating said hot spot to a high temperature; external means for supplying hydrocarbon fuel to said burner means; a gas in said envelope at or below a predetermined pressure which dissociates in the presence of said gas-fired energy source in said envelope; and another substance in said envelope which converts the heat of recombination of the dissociated gas into visible light.

2. The light source of claim 1 wherein said burner means comprises a recuperative gas burner using combustion products to preheat incoming gas.

3. The light source of claim 1 wherein said gas in said envelope comprises hydrogen, and wherein said other substance comprises a phosphor.

4. The light source of claim 1, wherein said hot spot is formed of thorium oxide.

5. The light source of claim 2, wherein said recuperative gas burner is fueled with a mixture of methane and air.

6. The light source of claim 3 wherein said high temperature energy source comprises a hot spot formed of a material through which hydrogen can diffuse; and gas burner means for heating said hot spot, said gas burner means being fueled with a gaseous mixture including an amount of hydrogen sufficient to balance the pressure of the hydrogen in said envelope.

7. The light source of claim 6 wherein said gaseous fuel comprises air and hydrogen.

8. The light source of claim 6 wherein said gaseous fuel comprises methane and hydrogen.

9. The light source of claim 1, wherein the pressure of said hydrogen in said envelope is within a range of 1—50 mm./Hg.